US012808504B2

(12) United States Patent
Wang et al.

(10) Patent No.: US 12,808,504 B2
(45) Date of Patent: Nov. 24, 2026

(54) WALL LAMP WITH QUICK INSTALLATION AND ADJUSTABLE ANGLE AND IMPLEMENTATION METHOD THEREFOR

(71) Applicant: Hengdian Group Tospo Lighting Co., Ltd., Dongyang (CN)

(72) Inventors: Wenfeng Wang, Dongyang (CN); Huaxin Duan, Dongyang (CN); Meiling Jin, Dongyang (CN); Jiangen Wei, Dongyang (CN); Zhiying Huang, Dongyang (CN)

(73) Assignee: Hengdian Group Tospo Lighting Co., Ltd., Jinhua (CN)

( * ) Notice: Subject to any disclaimer, the term of this patent is extended or adjusted under 35 U.S.C. 154(b) by 0 days.

(21) Appl. No.: 19/291,688

(22) Filed: Aug. 6, 2025

(65) Prior Publication Data

US 2026/0043528 A1 Feb. 12, 2026

(30) Foreign Application Priority Data

Aug. 7, 2024 (CN) ......................... 202411078428.8

(51) Int. Cl.
*F21S 8/00* (2006.01)
*F21V 23/04* (2006.01)

(52) U.S. Cl.
CPC .............. *F21S 8/033* (2013.01); *F21V 23/04* (2013.01)

(58) Field of Classification Search
CPC .......... F21V 19/02; F21V 21/30; F21V 23/04; F21Y 2115/10; F21S 8/033
See application file for complete search history.

(56) References Cited

U.S. PATENT DOCUMENTS

| | | | | |
|---|---|---|---|---|
| 5,613,766 A * | 3/1997 | Raouf | F21V 23/02 | 362/147 |
| 6,290,376 B1 * | 9/2001 | Gutierrez | F21S 8/033 | 362/463 |
| 7,150,542 B1 * | 12/2006 | Russello | F21S 8/033 | 362/370 |
| 9,310,037 B2 * | 4/2016 | Cercone | H05B 47/175 | |
| 2006/0034080 A1 * | 2/2006 | Tsao | F21V 14/08 | 362/253 |
| 2018/0031191 A1 * | 2/2018 | Xiang | F21V 15/01 | |
| 2022/0252244 A1 * | 8/2022 | Erdener | F21V 23/007 | |
| 2024/0255131 A1 * | 8/2024 | Yu | F21V 17/12 | |

* cited by examiner

*Primary Examiner* — Zheng Song
(74) *Attorney, Agent, or Firm* — JMB Davis Ben-David

(57) ABSTRACT

Disclosed is a wall lamp with quick installation and an adjustable angle, including a housing. A driving member is installed inside the housing; an installation base is connected to a back side of the housing; an arc-shaped cavity is disposed at a lower end of a front side of the housing; a lamp body is connected inside the arc-shaped cavity; the lamp body includes a radiator; a light source board is installed inside the radiator; a lens is connected to a front side of the radiator; two connecting pillars are connected to a back side of the radiator; adjusting slots corresponding to the connecting pillars are disposed in the arc-shaped cavity; and end portions of the connecting pillars pass through the adjusting slots and are then connected to friction blocks.

11 Claims, 7 Drawing Sheets

WALL LAMP WITH QUICK INSTALLATION AND ADJUSTABLE ANGLE AND IMPLEMENTATION METHOD THEREFOR

CROSS-REFERENCE TO RELATED APPLICATION

Benefit is claimed to Chinese patent application No. 202411078428.8 filed Aug. 7, 2024, the entirety disclosure of which is herein incorporated by reference.

FIELD

The present disclosure pertains to the technical field of wall lamps, and in particular relates to a wall lamp with quick installation and an adjustable angle and an implementation method therefor.

BACKGROUND

With the development of society, wall lamps are used on more and more occasions. Hence, requirements for related functions, and optics of the lamps are becoming more complex.

There are some problems in practical applications of traditional wall lamps on the market, such as: fixed light-emitting angles, limited usage areas; complicated installation procedures, leading to high installation costs and high installation safety risks.

SUMMARY

Described herein is a wall lamp, comprising a housing, wherein a driving member is installed inside the housing; an installation base is connected to a back side of the housing; an arc-shaped cavity is disposed at a lower end of a front side of the housing; a lamp body is connected inside the arc-shaped cavity; the lamp body comprises a radiator; a light source board is installed inside the radiator; a lens is connected to a front side of the radiator; two connecting pillars are connected to a back side of the radiator; two adjusting slots corresponding to the connecting pillars are disposed in the arc-shaped cavity; and an end portion of each of the connecting pillars passes through a corresponding adjusting slot and is connected to a friction block.

DETAILED DESCRIPTION

Figure 1:
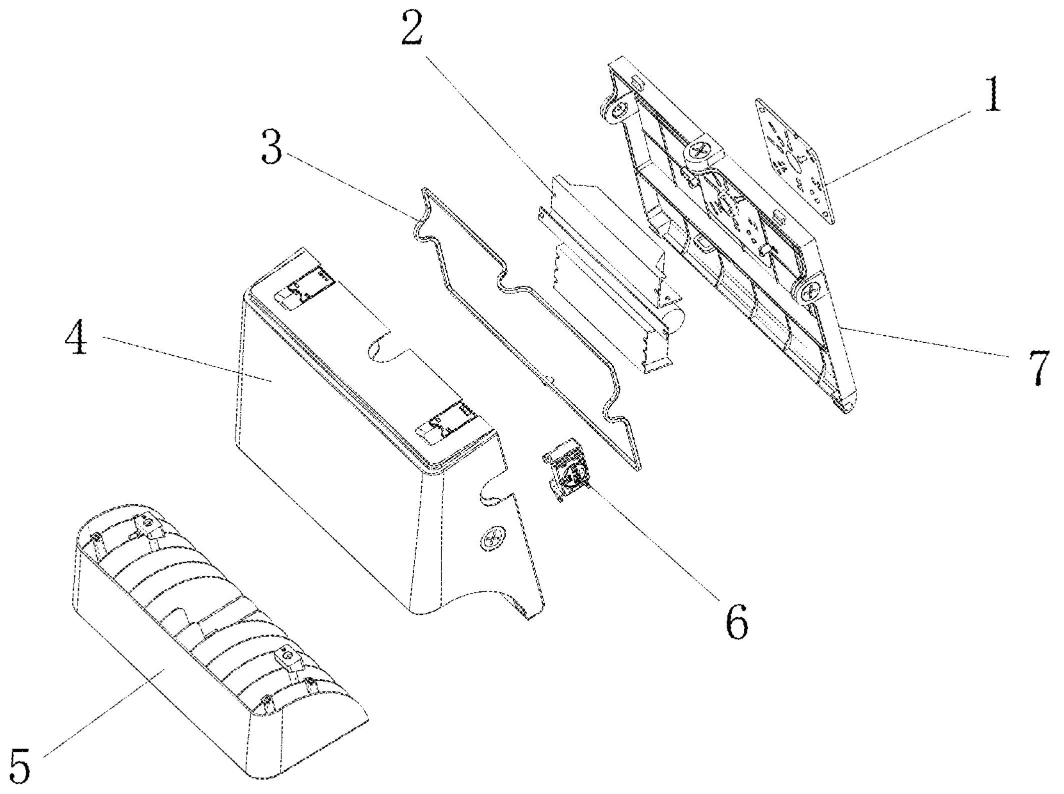
FIG. 1 is an exploded structural schematic diagram of the present disclosure.

An object of the present disclosure is to provide a wall lamp with quick installation and an adjustable angle to solve at least one of the problems raised in the above background art. The wall lamp with quick installation and an adjustable angle provided herein is characterized by an adjustable light-emitting angle and convenient quick installation.

Another object of the present disclosure is to provide an installation and adjustment method for a wall lamp with quick installation and an adjustable angle.

In order to achieve the above objects, the present disclosure provides the following technical solutions: a wall lamp, comprising a housing, wherein a driving member is installed inside the housing; an installation base is connected to a back side of the housing; an arc-shaped cavity is disposed at a lower end of a front side of the housing; a lamp body is connected inside the arc-shaped cavity; the lamp body comprises a radiator; a light source board is installed inside the radiator; a lens is connected to a front side of the radiator; two connecting pillars are connected to a back side of the radiator; two adjusting slots corresponding to the connecting pillars are disposed in the arc-shaped cavity; and an end portion of each of the connecting pillars passes through a corresponding adjusting slot and is connected to a friction block.

In order to make the installation base and an installation surface more tightly connected, further, an Ethylene Vinyl Acetate (EVA) foam is disposed on a back side of the installation base.

In order to provide friction so as to ensure stability after light-emitting angle adjustment, further, the back side of the radiator is further provided with one or more plug slots, each plug slot is embedded with a silicone rubber plug, and an end portion of each silicone rubber plug protrudes from each plug slot.

In order to facilitate quick rotation of the lamp body to a desired light-emitting angle, further, an angle mark is disposed on a side surface of the radiator, and an indication arrow corresponding to the angle mark is disposed on the housing.

In order to connect the housing and the installation base without the help of tools, achieving quick installation without using accessories such as screws, thereby reducing installation costs, further, two sides of a lower side edge of the installation base are each provided with a connecting slot, and two connecting blocks, each corresponding to each connecting slot, are disposed on the housing. Two locking blocks are connected to an upper side edge of the installation base, and buckles corresponding to the locking blocks are connected to the housing. The buckles are each connected to a spring, and the buckles are each connected to the housing through each spring.

In order to facilitate adjustment of the color temperature and power of the entire lamp and increase functionality of the wall lamp, further, the light source board comprises a first color-temperature light source and a second color-temperature light source with a higher color temperature than that of the first color-temperature light source, and a dimming switch is installed on a side inside the housing. A plug corresponding to the dimming switch is engaged with the housing.

Further in the present disclosure, an installation and adjustment method for the wall lamp includes: passing the end portion of each of the connecting pillars of the heat sink through the corresponding adjusting slot of the arc-shaped cavity; fixing the friction block onto the end portion of each of the connecting pillars; rotating the lamp body along the adjusting slots of the arc-shaped cavity via the connecting pillars of the heat sink to adjust a light emission angle of the lamp body; and applying friction to the housing through the friction block to stabilize a position of the lamp body after adjusting the light emission angle of the lamp body.

Further, the method includes: embedding a silicone rubber plug into a plug slot on the back side of the heat sink, allowing an end portion of the silicone rubber plug to protrude from the plug slot; and applying additional friction to the housing through the end portion of the silicone rubber plug to further stabilize the position of the lamp body after adjusting the light emission angle of the lamp body.

Further, the method includes: fixing the installation base to an installation surface; engaging a connecting block of the housing with a connecting slot of the installation base to achieve positioning between the housing and the installation base; and installing the housing onto the installation base through engagement between a buckle connected to the housing and a locking block connected to the installation base.

Further, the method includes: providing a dimming switch inside the housing, wherein the dimming switch comprises a color temperature Dual In-line Package (DIP) switch and a power DIP switch; screwing a plug corresponding to the dimming switch onto the housing to cover the dimming switch; and unscrewing the plug and toggling the color temperature DIP switch, power DIP switch, or both when adjusting color temperature, power, or both.

Compared with the prior art, the beneficial effects of the present disclosure are:

The arc-shaped cavity is disposed at the lower end of the front side of the housing; the adjusting slots are disposed in the arc-shaped cavity; the two connecting pillars are connected to the back side of the radiator; the end portions of the connecting pillars pass through the adjusting slots; and the friction blocks are screwed to the end portions of the connecting pillars by screws, so that the lamp body can rotate in the arc-shaped cavity, thereby implementing adjustment of a light-emitting angle;

In the present disclosure, the friction blocks and silicone rubber plugs act on the housing to provide friction so as to ensure stability after angle adjustment;

According to the present disclosure, the angle mark is disposed on the side surface of the radiator; and the indication arrow corresponding to the angle mark is disposed on the housing in order to facilitate quick rotation of the lamp body to the desired light-emitting angle;

According to the present disclosure, the lower side of the housing and the installation base are connected and limited through the cooperation of the connecting blocks with the connecting slots; and the upper side of the housing and the installation base are connected through the cooperation of the buckles with the locking blocks. Hence, the housing and the installation base are connected without the help of tools, achieving quick installation without using accessories such as screws, thereby reducing installation costs; and According to the present disclosure, the light source board includes a low-color-temperature light source and a high-color-temperature light source; and a dimming switch is installed on one side inside the housing, in order to facilitate adjustment of the color temperature and power of the entire lamp and increase functionality of the wall lamp.

In the drawings: 1. EVA foam; 2. driving member; 3. sealing ring; 4. housing; 41. arc-shaped cavity; 42. adjusting slot; 43. indication arrow; 44. connecting block; 45. buckle; 451. spring; 46. plug; 5. lamp body; 51. radiator; 511. plug slot; 512. connecting pillar; 513. angle mark; 52. light source board; 53. lens; 54. friction block; 55. silicone rubber plug; 6. dimming switch; 7. installation base; 71. locking block; and 72. connecting slot.

The following clearly describes the technical solutions in the embodiments of the present disclosure with reference to the accompanying drawings in the embodiments of the present disclosure. Apparently, the described embodiments are merely part rather than all of the embodiments of the present disclosure. Based on the embodiments of the present disclosure, all other embodiments obtained by those of ordinary skill in the art without paying creative effort fall within the scope of protection of the present disclosure.

Embodiment 1

Figure 2:
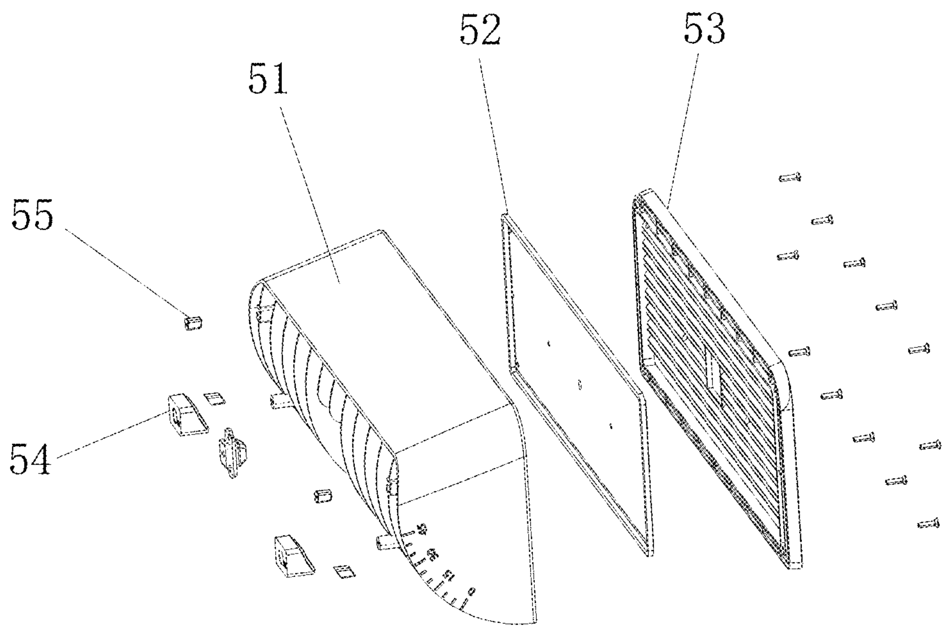
FIG. 2 is an exploded structural schematic diagram of a lamp body of the present disclosure.
Figure 3:
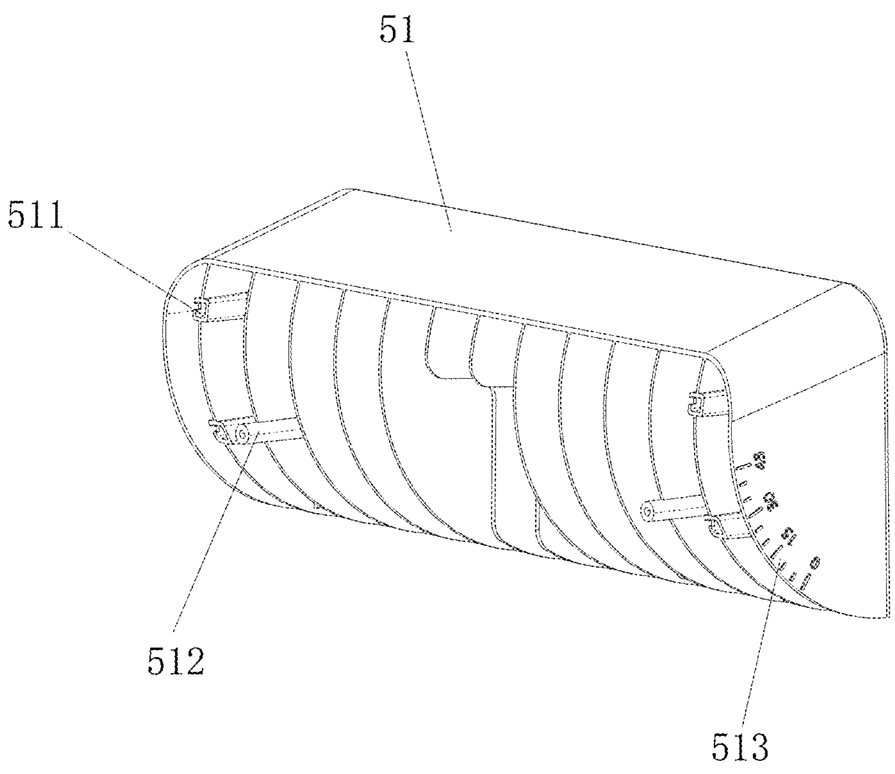
FIG. 3 is a schematic structural diagram of a radiator of the present disclosure.
Figure 4:
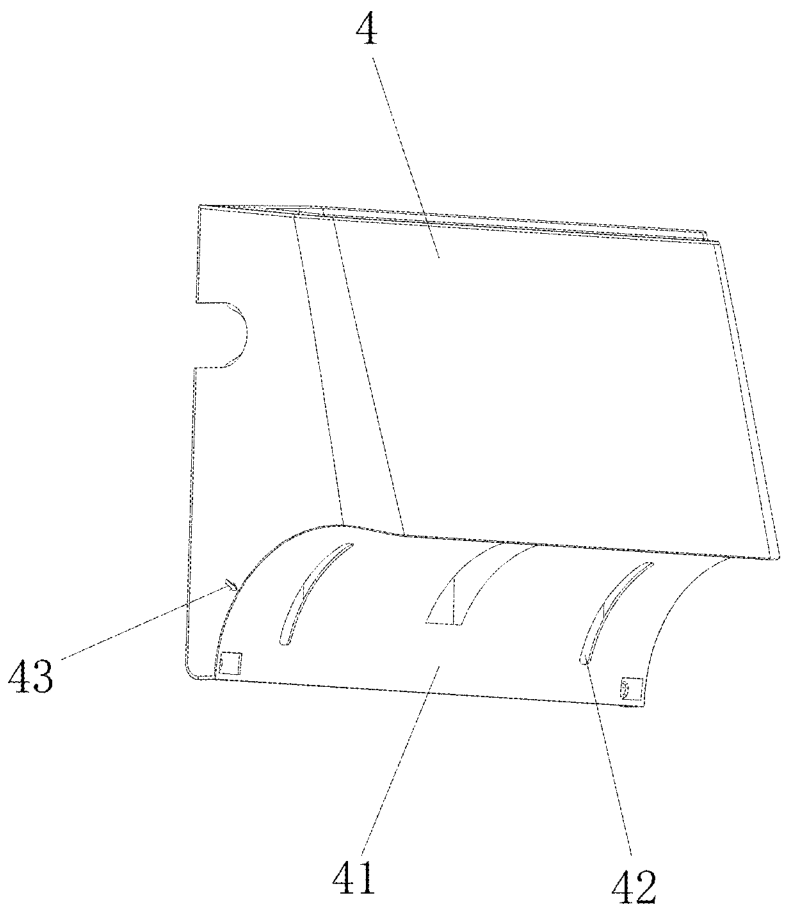
FIG. 4 is a schematic structural diagram of a housing of the present disclosure.
Figure 5:
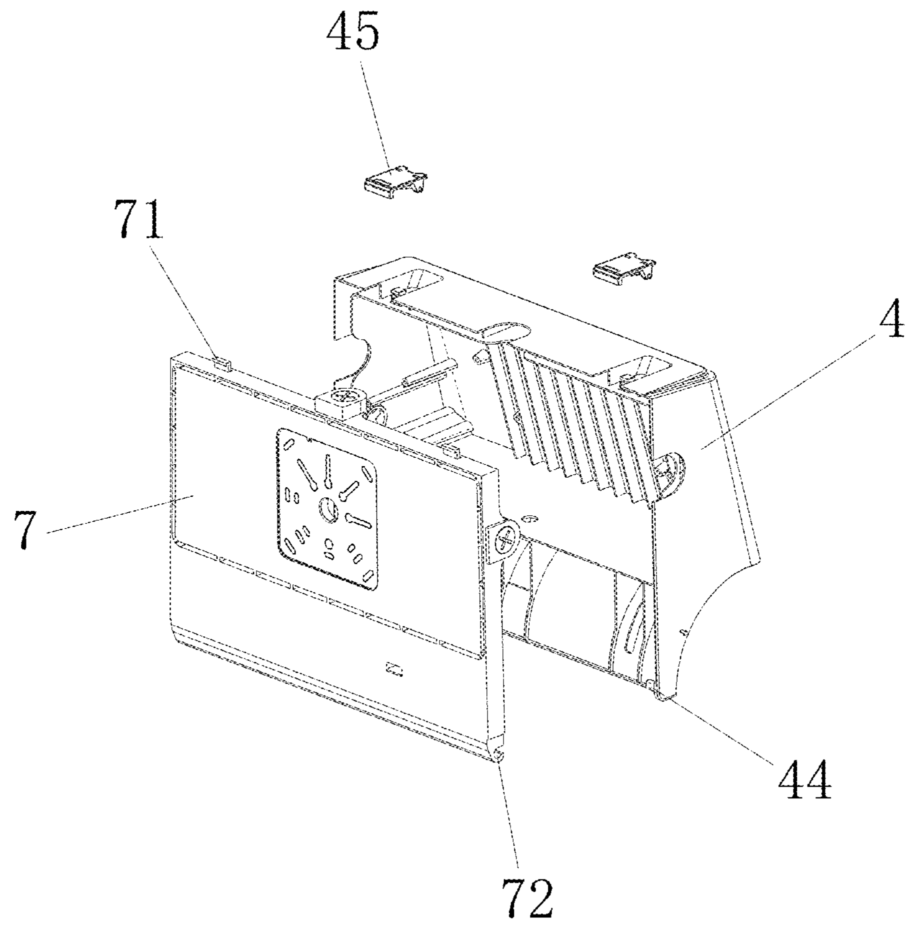
FIG. 5 is an exploded structural schematic diagram of connection between a housing and an installation base of the present disclosure.
Figure 6:
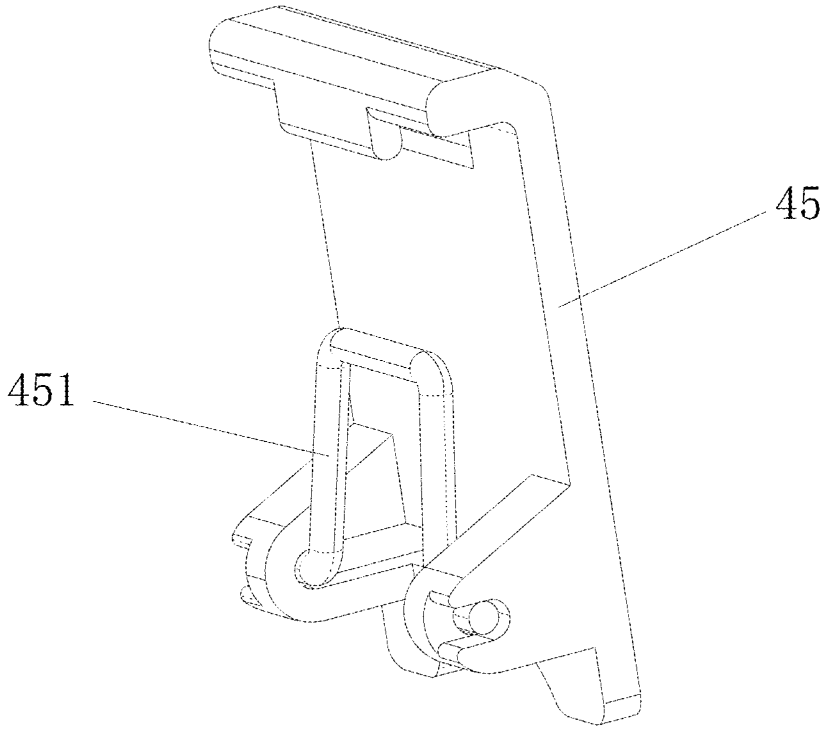
FIG. 6 is a schematic structural diagram of a buckle of the present disclosure.
Figure 7:
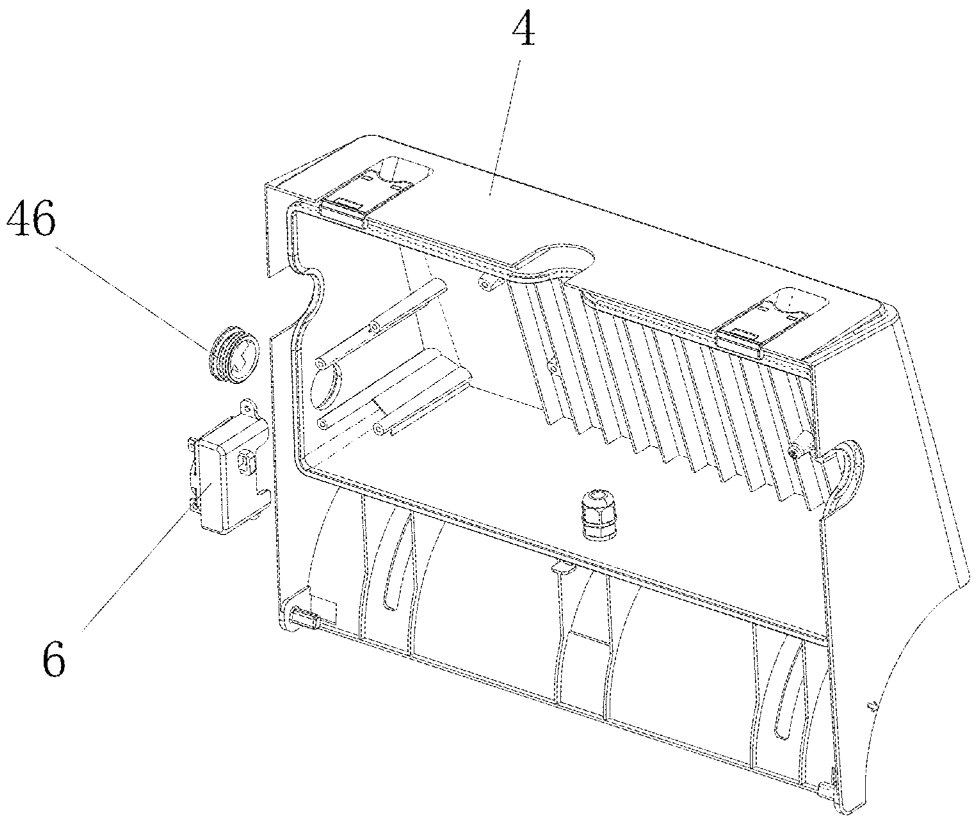
FIG. 7 is a schematic structural diagram of connection between a dimming switch and a housing of the present disclosure.

Referring to FIG. 1-Fig. 7, the present disclosure provides the following technical solution: a wall lamp with quick installation and an adjustable angle, including a housing 4, a driving member 2 is installed inside the housing 4; an installation base 7 is connected to a back side of the housing 4; a sealing slot is disposed on the back side of the housing 4; a sealing ring 3 is embedded inside the sealing slot; an arc-shaped cavity 41 is disposed at a lower end of a front side of the housing 4; a lamp body 5 is connected inside the arc-shaped cavity 41; the lamp body 5 includes a radiator 51; a light source board 52 is installed inside the radiator 51; a lens 53 is connected to a front side of the radiator 51; two connecting pillars 512 are connected to a back side of the radiator 51; two adjusting slots 42 corresponding to the two connecting pillars 512 are disposed in the arc-shaped cavity 41; and an end portions of each of the connecting pillars 512 passes through a corresponding adjusting slot 42 and is then connected to a friction block 54. An arc-shaped surface corresponding to the arc-shaped wall on the rear side of the arc-shaped cavity 41 is disposed on the friction block 54, enabling the friction block 54 to slide arcuately along the arc-shaped wall on the rear side of the arc-shaped cavity 41 via its arc-shaped surface.

By adopting the above technical solution, the arc-shaped cavity 41 is disposed at the lower end of the front side of the housing 4; the adjusting slots 42 are disposed in the arc-shaped cavity 41; the two connecting pillars 512 are connected to the back side of the radiator 51; the end portions of the connecting pillars 512 pass through the adjusting slots 42 from the front side of the housing 4 to the rear side of the housing 4.; and the friction block 54 is tightened to the end portion of the connecting pillar 512 from the rear side of the arc-shaped cavity 41 by screws. The arc-shaped surface of the friction block 54 fits snugly against and makes contact with the corresponding arc-shaped wall at the adjusting slot 42 on the rear side of the arc-shaped cavity 41, and the friction block 54 can apply, through its arcuate surface, friction force to the rear side of the housing 4 that does not interfere with the rotation of the lamp body 5 but is sufficient to maintain the position of the lamp body 5 after rotation. The connecting pillar 512 can move from one end of the adjusting slot 42 to the other, so that the lamp body 5 can rotate in the arc-shaped cavity 41, thereby implementing adjustment of a light-emitting angle of the lamp body 5. After the lamp body 5 is rotated to the desired position (angle), the friction blocks 54 acts on the housing 4 to provide friction force or damping force, ensuring stability after angle adjustment.

Specifically, EVA foam 1 is disposed on a back side of the installation base 7.

By adopting the above technical solution, the installation base 7 and an installation surface are connected more tightly.

Specifically, the back side of the radiator 51 is further provided with four plug slots 511; each plug slot 511 is embedded with a silicone rubber plug 55; and an end portion of each silicone rubber plug 55 protrudes from each plug slot 511. Since the end portion of the silicone rubber plug 55 protrudes beyond the plug slot 511, it can abut against the front face of the arc-shaped cavity 41, thereby providing additional frictional force to further enhance the stability of the lamp body 5. The silicone rubber plug 55 acts on the front surface of the arc-shaped cavity 41 of the housing 4, while the friction block 54 acts on the rear side of the arc-shaped cavity 41, with both components collectively applying friction to the housing 4 to ensure positional stability of the lamp body 5 after angle adjustment.

Embodiment 2

This embodiment differs from Embodiment 1 in that: specifically, an angle mark 513 is disposed on a side surface of the radiator 51; and an indication arrow 43 corresponding to the angle mark 513 is disposed on the housing 4.

By adopting the above technical solution, quick rotation of the lamp body 5 to a desired angle is facilitated.

Embodiment 3

This embodiment differs from Embodiment 1 in that: specifically, two sides of a lower side edge of the installation base 7 are each provided with a connecting slot 72; and two connecting blocks 44 corresponding to the two connecting slots 72 are disposed on the housing 4. Two locking blocks 71 are connected to an upper side edge of the installation base 7; and two buckles 45 corresponding to the locking blocks 71 are connected to the housing 4. The buckles 45 are each connected to a spring; and the buckles 45 are each connected to the housing 4 through corresponding spring 451.

By adopting the above technical solution, the lower side of the housing 4 and the installation base 7 are connected and limited through the cooperation of the connecting blocks 44 with the connecting slots 72; and the upper side of the housing 4 and the installation base 7 are connected through the cooperation of the buckles 45 with the locking blocks 71. Hence, the housing 4 and the installation base 7 are connected without the help of tools, achieving quick installation without using accessories such as screws, thereby reducing installation costs.

Embodiment 4

This embodiment differs from Embodiment 1 in that: specifically, the light source board 52 includes a low-color-temperature light source and a high-color-temperature light source; a dimming switch 6 is installed on one side inside the housing 4; the dimming switch 6 includes a color temperature DIP switch and a power DIP switch; and a plug 46 corresponding to the dimming switch 6 is engaged with the housing 4.

By adopting the above technical solution, adjustment of the color temperature and power of the entire lamp is facilitated and functionality of the wall lamp is increased.

Embodiment 5

Further, an installation and adjustment method for the wall lamp includes: passing the end portion of each of the connecting pillars 512 of the heat sink 51 through the corresponding adjusting slot 42 of the arc-shaped cavity 41; fixing the friction block 54 onto the end portion of each of the connecting pillars 512; rotating the lamp body 5 along the adjusting slots 42 of the arc-shaped cavity 41 via the connecting pillars 512 of the heat sink 51 to adjust a light emission angle of the lamp body 5; applying friction to the housing 4 through the friction block 54 to stabilize a position of the lamp body 5 after adjusting the light emission angle of the lamp body 5; embedding a silicone rubber plug 55 into a plug slot 511 on the back side of the heat sink 51, allowing an end portion of the silicone rubber plug 55 to protrude from the plug slot 511; applying additional friction to the housing 4 through the end portion of the silicone rubber plug 55 to further stabilize the position of the lamp body 5 after adjusting the light emission angle of the lamp body 5; fixing the installation base 7 to an installation surface of a wall; engaging a connecting block 44 of the housing 4 with a connecting slot 72 of the installation base 7 to achieve positioning between the housing 4 and the installation base 7; installing the housing 4 onto the installation base 7 through engagement between a buckle 45 connected to the housing 4 and a locking block 71 connected to the installation base 7; providing a dimming switch 6 inside the housing 4, wherein the dimming switch 6 comprises a color temperature Dual In-line Package (DIP) switch and a power DIP switch; screwing a plug 46 corresponding to the dimming switch 6 onto the housing 4 to cover the dimming switch 6; and unscrewing the plug 46 and toggling the color temperature DIP switch, power DIP switch, or both when adjusting color temperature, power, or both.

In particular, the method includes:

- light-emitting angle adjustment: the silicone rubber plugs 55 are embedded inside the plug slots 511 on the back side of the radiator 51, end portions of the silicone rubber plugs 55 protrude from the plug slots 511, the end portions of the connecting pillars 512 pass through the adjusting slots 42, and the friction blocks 54 are screwed to the end portions of the connecting pillars 512 by screws; the friction blocks 54 and the silicone rubber plugs 55 act on the housing to provide friction;
- quick installation: the installation base 7 is fixed to an installation surface by screws; the housing 4 is connected and limited through the cooperation of the connecting blocks 44 with the connecting slots 72, and the installation is completed through the cooperation of the buckles 45 with the locking blocks 71; and
- color temperature or power adjustment: the dimming switch 6 includes a color temperature DIP switch and a power DIP switch; by unscrewing the plug 46 and toggling the corresponding DIP switch, adjustments can be made.

In summary, according to the present disclosure, the arc-shaped cavity 41 is disposed at the lower end of the front side of the housing 4; the adjusting slots 42 are disposed in the arc-shaped cavity 41; the two connecting pillars 512 are connected to the back side of the radiator 51; the end portions of the connecting pillars 512 pass through the adjusting slots 42; and the friction blocks 54 are screwed to the end portions of the connecting pillars 512 by screws, so that the lamp body 5 can rotate in the arc-shaped cavity 41, thereby implementing adjustment of a light-emitting angle. In the present disclosure, the friction blocks 54 and silicone rubber plugs 55 act on the housing 4 to provide friction so as to ensure stability after angle adjustment. According to the present disclosure, the angle mark 513 is disposed on the side surface of the radiator 51; and the indication arrow 43 corresponding to the angle mark 513 is disposed on the housing 4 in order to facilitate quick rotation of the lamp body 5 to the desired angle. According to the present disclosure, the lower side of the housing 4 and the installation base 7 are connected and limited through the cooperation of the connecting blocks 44 with the connecting slots 72; and the upper side of the housing 4 and the installation base 7 are connected through the cooperation of the buckles 45 with the locking blocks 71. Hence, the housing 4 and the installation base 7 are connected without the help of tools, achieving quick installation without using accessories such as screws, thereby reducing installation costs. According to the present disclosure, the light source board 52 includes a low-color-temperature light source and a high-color-temperature light source; and a dimming switch 6 is installed on one side inside the housing 4, in order to facilitate adjustment of the color temperature and power of the entire lamp and increase functionality of the wall lamp.

Although the embodiments of the present disclosure have been shown and described, for those of ordinary skill in the art, it will be appreciated that various changes, modifications, substitutions and variations can be made to these embodiments without departing from the principles and spirit of the present disclosure, and the scope of the present disclosure is defined by the appended claims and their equivalents.

We claim:

1. A wall lamp, comprising a housing, wherein a driving member is installed inside the housing; an installation base is connected to a back side of the housing; an arc-shaped cavity is disposed at a lower end of a front side of the housing; a lamp body is connected inside the arc-shaped cavity; the lamp body comprises a radiator; a light source board is installed inside the radiator; a lens is connected to a front side of the radiator; two connecting pillars are connected to a back side of the radiator; two adjusting slots corresponding to the connecting pillars are disposed in the arc-shaped cavity; and an end portion of each of the connecting pillars passes through a corresponding adjusting slot and is connected to a friction block;

wherein the back side of the radiator is further provided with one or more plug slots, each plug slot is embedded with a silicone rubber plug, and an end portion of each silicone rubber plug protrudes from each plug slot.

2. The wall lamp according to claim 1, wherein two sides of a lower side edge of the installation base are each provided with a connecting slot, and two connecting blocks, each corresponding to each connecting slot, are disposed on the housing.

3. The wall lamp according to claim 2, wherein two locking blocks are connected to an upper side edge of the installation base, and buckles corresponding to the locking blocks are connected to the housing.

4. The wall lamp according to claim 3, wherein the buckles are each connected to a spring, and the buckles are each connected to the housing through each spring.

5. The wall lamp according to claim 1, wherein the light source board comprises a first color-temperature light source and a second color-temperature light source with a higher color temperature than that of the first color-temperature light source, and a dimming switch is installed on a side inside the housing.

6. The wall lamp according to claim 5, wherein a plug corresponding to the dimming switch is engaged with the housing.

7. The wall lamp according to claim 1, wherein an Ethylene Vinyl Acetate (EVA) foam is disposed on a back side of the installation base.

8. The wall lamp according to claim 1, wherein an angle mark is disposed on a side surface of the radiator, and an indication arrow corresponding to the angle mark is disposed on the housing.

9. An installation and adjustment method for the wall lamp according to claim 1, comprising:

passing the end portion of each of the connecting pillars of the radiator through the corresponding adjusting slot of the arc-shaped cavity;

fixing the friction block onto the end portion of each of the connecting pillars;

rotating the lamp body along the adjusting slots of the arc-shaped cavity via the connecting pillars of the radiator to adjust a light emission angle of the lamp body;

applying friction to the housing through the friction block to stabilize a position of the lamp body after adjusting the light emission angle of the lamp body;

embedding each silicone rubber plug into each plug slot on the back side of the radiator, allowing the end portion of each silicone rubber plug to protrude from each plug slot; and applying additional friction to the housing through the end portion of each silicone rubber plug to further stabilize the position of the lamp body after adjusting the light emission angle of the lamp body.

10. The method of claim 9, further comprising:

fixing the installation base to an installation surface;

engaging a connecting block of the housing with a connecting slot of the installation base to achieve positioning between the housing and the installation base; and installing the housing onto the installation base through engagement between a buckle connected to the housing and a locking block connected to the installation base.

11. The method of claim 9, further comprising:

providing a dimming switch inside the housing, wherein the dimming switch comprises a color temperature Dual In-line Package (DIP) switch and a power DIP switch;

screwing a plug corresponding to the dimming switch onto the housing to cover the dimming switch; and unscrewing the plug and toggling the color temperature DIP switch, power DIP switch, or both when adjusting color temperature, power, or both.

* * * * *